(No Model.) 2 Sheets—Sheet 1.
G. W. BRIGGS.
GRASS AND WEED EXTERMINATOR.
No. 568,401. Patented Sept. 29, 1896.
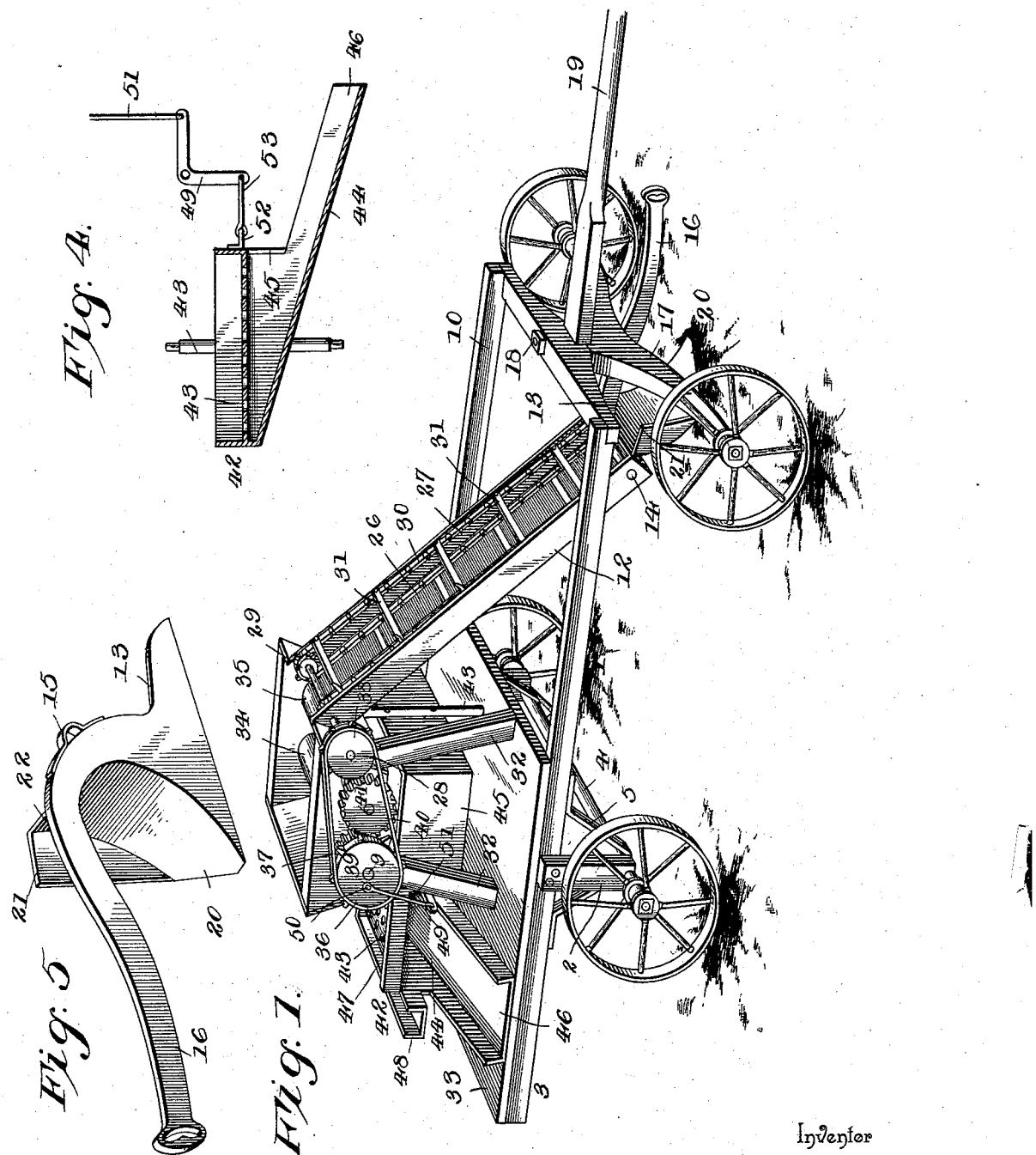
Witnesses
Chas. A. Ford.
G. H. Maxwell.
Inventor
George W. Briggs,
By his Attorneys,
C. A. Snow & Co.

(No Model.) 2 Sheets—Sheet 2.

G. W. BRIGGS.
GRASS AND WEED EXTERMINATOR.

No. 568,401. Patented Sept. 29, 1896.

Witnesses
Chas. A. Ford.
G. H. Maxwell.

Inventor
George W. Briggs,
By his Attorneys,
C. A. Snow & Co.

UNITED STATES PATENT OFFICE.

GEORGE W. BRIGGS, OF ITASCA, TEXAS.

GRASS AND WEED EXTERMINATOR.

SPECIFICATION forming part of Letters Patent No. 568,401, dated September 29, 1896.

Application filed September 19, 1895. Serial No. 563,001. (No model.)

*To all whom it may concern:*

Be it known that I, GEORGE W. BRIGGS, a citizen of the United States, residing at Itasca, in the county of Hill and State of Texas, have invented a new and useful Grass and Weed Exterminator, of which the following is a specification.

My invention relates to grass and weed destroyers or exterminators, and is especially adapted to utterly destroy those almost ineradicable weeds and obnoxious grasses which sprout and multiply from the roots, and whose roots permeate the ground with a network of runners that cannot be pulled up, such as quack grass, Johnson grass, Canada thistles, wild carrots, &c. I have invented a destroyer that first plows them up, going six to ten inches, or more, if necessary, into the soil and then crushes the entangled earth, so as to pulverize the plowed-up mass, and finally sifts and separates this mingled mass and collects the roots and tops, which are then bunched together to be burned.

My invention will now be described in detail, both as to construction and as to operation, and then set forth by claims.

Figure 3:
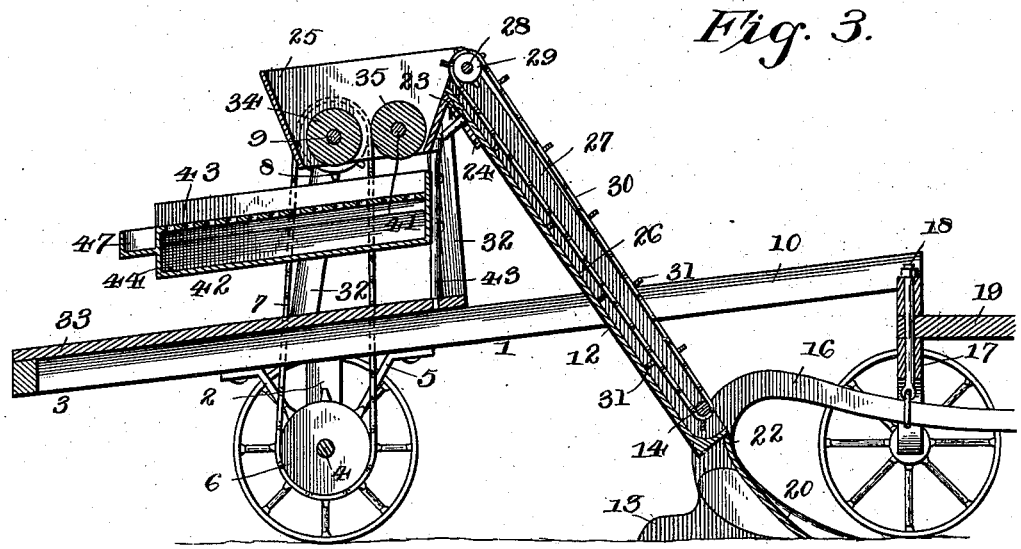
Figure 2:
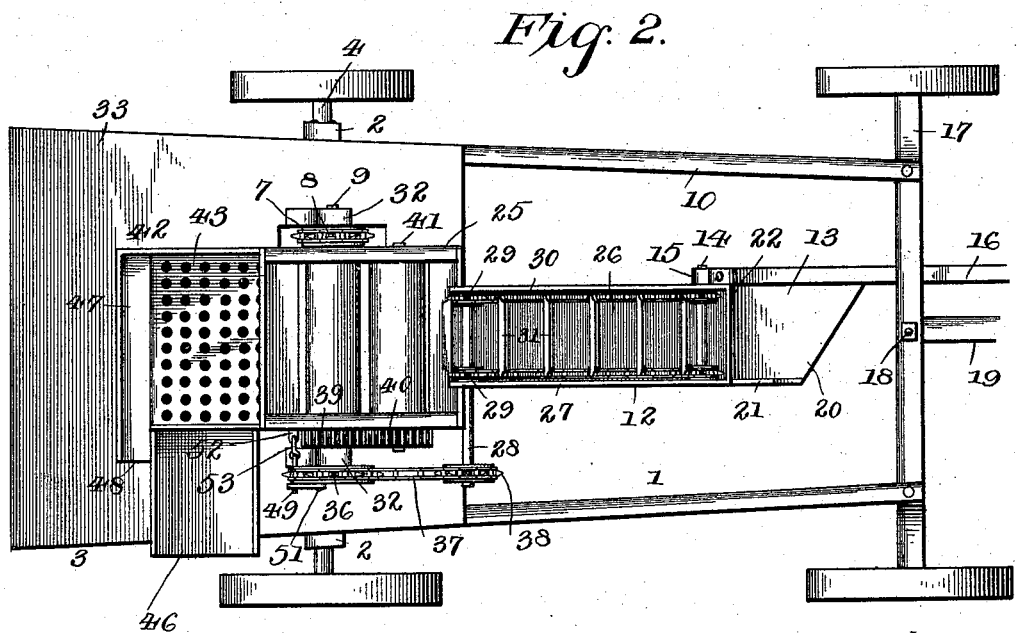

In the accompanying drawings, Figure 1 is a perspective view of my complete invention. Fig. 2 is a top plan view. Fig. 3 is a vertical longitudinal section with parts broken away. Fig. 4 is a transverse section of the riddle. Fig. 5 is a detail view of the plow, showing my moldboard attachment.

Reference-numeral 1 designates a wagon-truck substantially similar to any truck having four wheels and front and rear axles, but I have provided rear bolster-blocks 2, depending from the frame 3 and carrying the rear axle 4 at their lower extremities, the same being held thereto by metal straps 5. This is so as to provide room for a drive-wheel 6, keyed to said axle 4 adjacent to the left-hand or land side of the machine. This drive-wheel 6 is preferably a sprocket-wheel and operates the crushing and separating mechanisms, as presently described, by means of a sprocket-chain 7, which passes over sprocket-wheel 8 on the outer end of the main shaft 9.

At its forward end the wagon-frame 10 is open to receive the elevator or carrier chute 12, which is attached at its lower end to the plow 13 by means of the guide-rod 14 of the elevator, which projects horizontally at the left side thereof and is secured through a looped metal strap or horizontal bearing 15 at the rear end of the plow-beam 16. This plow-beam extends forward under the arched front axle 17, where it may be secured in any adjustable clevis or hanger from the king-bolt 18, or it may be attached in any suitable way to the tongue 19, so that the draft will be properly equalized; but this is not an essential of the present invention, so I do not present it in detail. The moldboard 20 of the plow is provided with an upturned side flange or deflector 21 and is extended at its rear end 22 to connect with the lower end of the elevator-chute 12. Otherwise the plow is of any ordinary pattern.

The elevator-chute 12 is secured at its upper end by a long bearing 23, passed through a suitable socket 24, formed in a bracket secured to the front end of the hopper 25, to be presently described. This elevator-chute has a smooth bottom 26 and side and bottom end walls 27, secured integrally thereto, so as to form a close trough. At its upper end shaft 28 is journaled transversely through the outer edges of side walls 27 and is provided with two sprocket-wheels 29 adjacent, respectively, to the inner sides of said walls. These sprocket-wheels revolve the endless carrier-apron 30 of the usual type, composed of a sprocket-chain on either side, passed over said sprocket-wheels and extending loosely down around the guide-rod 14, being transversely connected together at close intervals by bars 31, carrying scraper-blades on their outer edges. This carrier 30 elevates the plowed-up dirt, roots, and weeds and delivers them from the upper open end of the chute into the hopper 25, which is supported rigidly by bracing-knees 32 on the rear platform 33. This hopper is open at its bottom and carries adjacent thereto two parallel crushing-rollers 34 and 35, journaled horizontally at either end in the sides of the hopper 25. Roller 34 is journaled by being fixedly secured by a suitable spline or key to the main shaft 9, which receives its motion from the sprocket-wheel 8, driven by the traction of the machine through the rear axle 4, as before explained. At its opposite right-hand end this main shaft 9 is provided with a sprocket-wheel 36 of considerable size to connect by means of sprocket-chain 37 with a smaller sprocket-wheel 38, alined therewith and keyed to the extended end of shaft 28, whereby power is transmitted to revolve the elevator or carrier apron 30. Said main shaft 9 is also provided, preferably, between the hopper and adjacent bracing-knee 32, with a cog-wheel 39, which gears into a similar wheel 40 on the shaft 41 of the roller 35. This arrangement of gearing causes the two crushing-rollers to revolve over toward each other, and they are separated in proper alinement, so as to crush all the lumps of dirt and matted roots and earth before they pass through to the sieve or riddle 42 below.

Riddle 42 is pivoted centrally at its forward end on a long stout vertical pivot-rod 43, suitably journaled at its respective ends in the platform 33 and in the front end of the hopper 25. The riddle 42 comprises an upper perforated plate or screen 43, slanting a very little toward the rear, upwardly flanged at its sides and front end to retain the dirt and debris, and a lower imperforate plate 44, coextensive with said screen 43 and secured thereto by closed walls, so as to slant downwardly to the lower or right-hand wall 45, at the rear portion of which the wall is removed to provide an exit for the dirt and to secure a discharge-chute 46, which may be integral with the lower plate 44, or it may be hinged thereto. The discharge-chute 46 is of sufficient length to carry the sifted dirt onto the land that has been already plowed, so as to be out of the way of the machine when it plows its next furrow. At its rear end the screen 43 is provided with a collecting-trough 47, flanged at its rear side and left end, but open at its right-hand end 48. This collecting-trough slants downwardly toward its mouth 48, and is arranged to collect the roots and weeds which are sifted out from the dirt. This collected material is discharged at the mouth 48 into a box or bag provided on the platform or is discharged in a windrow and then gathered into heaps, and in either case is burned.

In order to separate the pulverized mass as it reaches the screen 43, the riddle is reciprocated back and forth laterally on its pivot-rod 43 with a jerking motion. The means by which this agitation is produced consist of a bell-crank 49, hung on a horizontal pivot at the rear side of knee 32 below the sprocket-wheel 36 and connected by one arm to an eccentric wrist-pin 50 on said sprocket-wheel by link-rod 51 and by its other arm to a perforated lug 52 on the riddle by a similar link-rod 53. This gives a vibrating horizontal jerking swing to the riddle at every revolution of the sprocket-wheel. Proper provision is made to keep the platform level by providing wheels of greater diameter on the loosely-plowed right-hand side or by providing any well-known means for lowering and adjusting the wheels on that side relatively to their axles.

The operation of my improved grass and weed destroyer is as follows: As the horses pull the plow and machine forward the furrow that is thrown up is deflected into the elevator-chute 12 and caught by the scraper-bars 31 of the carrier-apron 30 and carried over into the hopper 25. Here the mass of earth and weeds is pulverized by passing through between the rollers 34 and 35 and the disintegrated mass is agitated on the screen 43 of the riddle 42 until the dirt slides and rolls down plate 44 into the discharge-chute 46 and out on the ground, and the weeds, grass, and roots roll or work off into the collector-trough 47 and are gathered finally into heaps to be burned.

Many modifications and changes are within the scope of my invention, and accordingly I do not limit myself to the precise details here shown.

What I claim is—

1. In a grass and weed exterminator, the combination of a frame, a hopper, crushing-rolls arranged within the hopper, an elevator located in advance of the hopper, a vertical pivot journaled in suitable bearings and located beneath the hopper, a vibrating riddle fixed to the vertical pivot and arranged to oscillate horizontally, gearing coöperating with the crushing-rolls, and connections between the gearing and the riddle, whereby the latter is oscillated on its vertical pivot, substantially as described.

2. In a grass and weed exterminator, the combination of a frame, an excavator, an elevator connected therewith, a hopper located at the rear end of the elevator, crushing-rolls arranged within the hopper, a vertical pivot mounted on the frame, a horizontal oscillating riddle fixed at its front to the vertical pivot and comprising an upper screen, a lower plate arranged at an inclination, an earth-discharge chute, and a weed-collector located adjacent to the screen, gearing for operating the crushing-rolls, and connections between the gearing and the riddle, whereby the latter is horizontally oscillated on its vertical pivot, substantially as described.

In testimony that I claim the foregoing as my own I have hereto affixed my signature in the presence of two witnesses.

GEORGE W. BRIGGS.

Witnesses:
W. H. TIPTON,
W. T. OSLEY.